US011366639B2

(12) United States Patent
Park et al.

(10) Patent No.: US 11,366,639 B2
(45) Date of Patent: Jun. 21, 2022

(54) APPARATUS AND METHOD FOR GENERATING QUANTUM RANDOM NUMBER

(71) Applicants: ELECTRONICS AND TELECOMMUNICATIONS RESEARCH INSTITUTE, Daejeon (KR); KOREA ATOMIC ENERGY RESEARCH INSTITUTE, Daejeon (KR)

(72) Inventors: Kyung-Hwan Park, Daejeon (KR); Tae Wook Kang, Daejeon (KR); Jong Bum Kim, Daejeon (KR); Jin Joo Kim, Sejong (KR); Seong Mo Park, Daejeon (KR); Kwang-Jae Son, Sejong (KR); Young Rang Uhm, Daejeon (KR); Byounggun Choi, Daejeon (KR); Sang Mu Choi, Daejeon (KR); Jintae Hong, Daejeon (KR)

(73) Assignees: ELECTRONICS AND TELECOMMUNICATIONS RESEARCH INSTITUTE, Daejeon (KR); KOREA ATOMIC ENERGY RESEARCH INSTITUT, Daejeon (KR)

( * ) Notice: Subject to any disclaimer, the term of this patent is extended or adjusted under 35 U.S.C. 154(b) by 165 days.

(21) Appl. No.: 16/409,641

(22) Filed: May 10, 2019

(65) Prior Publication Data
US 2019/0347076 A1   Nov. 14, 2019

(30) Foreign Application Priority Data
May 11, 2018  (KR) .......................... 10-2018-0054533

(51) Int. Cl.
*G06F 7/58* (2006.01)

(52) U.S. Cl.
CPC .................................. *G06F 7/588* (2013.01)

(58) Field of Classification Search
CPC ........................... G06F 7/588; G06F 7/58–588
See application file for complete search history.

(56) References Cited

U.S. PATENT DOCUMENTS 5,987,483 A * 11/1999 Edelkind ................. G06F 7/588
                                                      708/250
6,298,360 B1 * 10/2001 Muller .................... G06F 7/582
                                                      708/250

(Continued)

FOREIGN PATENT DOCUMENTS

EP       1094603 A1    4/2001
KR    20060023305 A    3/2006

(Continued)

OTHER PUBLICATIONS

Wang on "Optical Detectors", Lecture Notes (2017). Retrieved on [Dec. 9, 2020]. Retrieved from the Internet <https://web.archive.org/web/20170828170948/https://depts.washington.edu/mictech/optics/me557/detector.pdf> (Year: 2017).*

(Continued)

*Primary Examiner* — Emily E Larocque
*Assistant Examiner* — Carlo Waje

(57) ABSTRACT

The exemplary embodiments of the present invention provide a quantum random number generation apparatus according to an exemplary embodiment of the present invention including: a space-division semiconductor detector including a plurality of cells, each individually absorbing a plurality of emission particles emitted from a radioactive isotope; and a signal processor that generates a random number based on an absorption event at which the plurality of emission particles are absorbed into the plurality of cells, and thus new type of random number conversion method that combines a spatial randomness and existing temporal (Continued)

randomness of the emission particle can be provided, there is no restriction generated due to the dead time, the random number generation rate can be remarkably increased, and it is possible to generate of a pure random number at high speed, which is required by a computer, a network processor, or an IoT device.

18 Claims, 5 Drawing Sheets

(56) References Cited

U.S. PATENT DOCUMENTS

| | | | |
|---|---|---|---|
| 6,415,309 B1* | 7/2002 | Shilton | G06F 7/588 |
| | | | 708/250 |
| 6,571,263 B1 | 5/2003 | Nagai | |
| 6,697,829 B1* | 2/2004 | Shilton | H03K 3/84 |
| | | | 708/255 |
| 7,286,021 B2 | 10/2007 | Kim | |
| 7,519,641 B2* | 4/2009 | Ribordy | G06F 7/588 |
| | | | 708/255 |
| 7,844,649 B2 | 11/2010 | Fiorentino et al. | |
| 7,849,121 B2 | 12/2010 | Fiorentino et al. | |
| 7,849,122 B2 | 12/2010 | Fiorentino et al. | |
| 8,158,449 B2* | 4/2012 | Cabral, Jr. | H01L 22/10 |
| | | | 438/56 |
| 9,189,201 B2 | 11/2015 | Jacobson et al. | |
| 9,335,972 B2 | 5/2016 | Yang et al. | |
| 9,335,973 B2 | 5/2016 | Pooser | |
| 9,423,819 B2 | 8/2016 | Marandi et al. | |
| 9,658,831 B2 | 5/2017 | Sartor et al. | |
| 9,710,231 B2 | 7/2017 | Youn et al. | |
| 9,727,310 B2 | 8/2017 | Margetts | |
| 10,042,609 B2 | 8/2018 | Reulet | |
| 10,146,508 B2 | 12/2018 | Pavesi et al. | |
| 10,430,161 B1* | 10/2019 | Tatarkiewicz | G06F 7/588 |
| 2003/0018674 A1* | 1/2003 | Figotin | G06F 7/588 |
| | | | 708/250 |
| 2006/0242415 A1* | 10/2006 | Gaylor | G06F 21/41 |
| | | | 713/176 |
| 2014/0082674 A1 | 3/2014 | Shin et al. | |
| 2014/0321645 A1 | 10/2014 | Koo et al. | |
| 2016/0202954 A1 | 7/2016 | Manipatruni et al. | |
| 2016/0328211 A1* | 11/2016 | Nordholt | G06F 7/588 |
| 2017/0010864 A1 | 1/2017 | Jacobson et al. | |
| 2017/0161022 A1 | 6/2017 | Chen et al. | |
| 2017/0249125 A1* | 8/2017 | Pavesi | G06F 7/588 |
| 2017/0346126 A1* | 11/2017 | Baik | G06F 7/588 |
| 2018/0068305 A1 | 3/2018 | Baik et al. | |
| 2018/0260192 A1 | 9/2018 | Choi et al. | |
| 2019/0012145 A1 | 1/2019 | Reulet | |
| 2019/0205100 A1* | 7/2019 | Massari | H04L 9/0852 |
| 2020/0065069 A1* | 2/2020 | Tyagi | H04L 9/0852 |

FOREIGN PATENT DOCUMENTS

| | | |
|---|---|---|
| KR | 101062790 B1 | 9/2011 |
| KR | 20150062944 A | 6/2015 |
| KR | 20150100387 A | 9/2015 |
| KR | 101617832 B1 | 5/2016 |
| KR | 20160061316 A | 5/2016 |
| KR | 101637187 B1 | 7/2016 |
| KR | 101646506 B1 | 8/2016 |
| KR | 20160134914 A | 11/2016 |
| KR | 20170007781 A | 1/2017 |
| KR | 101721173 B1 | 3/2017 |
| KR | 20170024105 A | 3/2017 |
| KR | 101729663 B1 | 4/2017 |
| KR | 101745964 B1 | 6/2017 |

OTHER PUBLICATIONS

Herrero-Collantes et al. (NPL—"Quantum Random Number Generators"). Retrieved on [Dec. 9, 2020]. Retrieved from the Internet <https://arxiv.org/pdf/1604.03304.pdf> (Year: 2016).*

Quirong et al. in "Multi-bit quantum random number generation by measuring positions of arrival photons" on Review of Scientific Instruments 85, 103116 (2014). Retrieved from the Internet <https://doi.org/10.1063/1.4897485> (Year: 2014).*

M. Stipčević and J. E. Bowers, "Spatio-temporal optical random number generator," Opt. Express 23, 11619-11631, 2015 https://doi.org/10.1364/OE.23.011619 (Year: 2015).*

* cited by examiner

APPARATUS AND METHOD FOR GENERATING QUANTUM RANDOM NUMBER

CROSS-REFERENCE TO RELATED APPLICATION

This application claims priority to and the benefit of Korean Patent Application No. 10-2018-0054533 filed in the Korean Intellectual Property Office on May 11, 2018, the entire contents of which are incorporated herein by reference.

BACKGROUND OF THE INVENTION

(a) Field of the Invention

An exemplary embodiment of the present invention relates to an apparatus for generating a quantum random number and a method for generating quantum random numbers.

(b) Background of the Invention

The phenomenon of natural decay of radioactive isotopes has all the features that can be used as pure random number entropy, such as randomness of collapse events, uncorrelation with previous events, and irrelevancy to physical environmental conditions.

In a recent information security field, a method related to pure random numbers, which are most effective in prevention of hacking, has been advanced day by day. The pure random numbers used in related companies are mostly supplied from a small number of specialized agencies.

However, there is a problem in that the random number generation rate of all the pure random number generation apparatus operated by the specialized agencies is not sufficiently fast. Such a problem is a fatal delay factor in the field of information processing, which requires a lot of things to be processed such as electronic commerce or mobile authentication. Accordingly, it is important to improve the random number generation rate of the pure random number generation apparatus.

A pseudo random number is generated through a software-based algorithm, but the pure random number is extracted from hardware-based random phenomena. The software-based pseudo random number apparatus can arbitrarily increase the random number generation rate by manipulation, but the hardware-based random number generation apparatus cannot artificially control the generation rate of a random phenomenon and accordingly there is a limitation in increasing the random number generation rate.

Such a hardware-based random number generation method includes a method using naturally occurring noise and a method using a quantum mechanical random phenomenon. Among the above-stated two random number generation methods, the naturally occurring noise has a tendency to be influenced by the external environment such as temperature/humidity/pressure, and thus a random number generated by using the naturally occurring noise also has a tendency, which is out of the random number definition that requires untendency. Meanwhile, quantum mechanical random phenomena are independent of environmental conditions, and thus a random number generated from the quantum mechanical random phenomena is academically recognized as a pure random number.

The quantum mechanical random phenomenon includes a phenomenon related to randomness of light and natural collapse of a radioactive isotope. When the natural collapse of the radioactive isotope is used, there exists a dead time inherent in an emission particle detector that measures emission particles emitted from the natural collapse of the radioactive isotope. The dead time implies a specific time interval during which only the first event of a series of collapse events occurring at very short intervals is detected, and subsequent events are not detected. This is addition of time taken for charge carriers (electrons, holes) produced by the emission particles in a diode in the emission particle detector to travel to a diode anode and cathode and time taken for travelling back to the steady state.

In order to reduce the dead time, methods for controlling a doping concentration of a diode element, a bonding structure, and a reverse bias voltage have been suggested, but there is a limit in the methods for minimizing the dead time. When a radiation amount of the radioactive isotope is increased, an emission event of the emission particles per unit time is increased and thus a pure random number generation rate can be increased. However, since emission particles emitted during a shorter time period than the dead time cannot be detected by the emission particle detector, the random number generation rate is limited by the dead time.

When entropy (random source) is sampled with high speed as an alternative method to increase the random number generation rate, the sampling time interval becomes narrower and the probability of autocorrelation between the preceding and succeeding sampling data becomes higher and thus independency between the respective sample data is broken, thereby disabling generation of a pure random number.

Therefore, increasing the rate of pure random number generation is currently the biggest problem of the pure random number generation method.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a quantum random number generation apparatus that can overcome the restriction of dead time, and a method thereof.

A quantum random number generation apparatus according to an exemplary embodiment of the present invention includes: a space-division semiconductor detector including a plurality of cells, each individually absorbing a plurality of emission particles emitted from a radioactive isotope; and a signal processor that generates a random number based on an absorption event at which the plurality of emission particles are absorbed into the plurality of cells.

The space-division semiconductor detector may further include a semiconductor substrate, and the plurality of cells may be disposed on a first side of the semiconductor substrate, which faces the radioactive isotope.

The plurality of cell may include: a plurality of diode cells respectively independently absorbing the plurality of emission particles, and outputting an array signal in response to the absorption event; and a plurality of resistance circuit cells that are electrically connected with the plurality of diode cells and transmit the array signal to the signal processor.

After a first emission particle is absorbed by a first diode cell, a second emission particle may be absorbed by a second diode cell before a first array signal is output in response to an absorption event at which the first emission particle is absorbed.

The first array signal may include a first pulse signal that includes information on a time at which the first emission particle is absorbed and a first location signal that includes information on a location of the first diode cell, a second array signal may include a second pulse signal that includes information on a time at which the second emission particle is absorbed and a second location signal that includes information on a location of the second diode cell, and the signal processor may generate the random number based on the first and second pulse signals and the first and second location signals.

The signal processor may generate a first random number based on the first pulse signal and the second pulse signal, and may generate a second random number based on the first location signal and the second location signal.

The quantum random number generation apparatus may further include an amplification circuit that amplifies the array signal and transmits the amplified array signal to the signal processor.

The quantum random number generation apparatus may further include a reverse bias power source that supplies reverse bias power to the plurality of cells and is formed of a closed circuit with the plurality of cells.

A method for generating a random number by a quantum random number generation apparatus according to an exemplary embodiment of the present invention includes: absorbing a first emission particle through a first cell; outputting a first array signal in response to a first absorption event at which the first emission particle is absorbed into the first cell; absorbing a second emission particle through a second cell before the first array signal is output after the first absorption event; outputting a second array signal in response to a second absorption event at which the second emission particle is absorbed into the second cell; and generating a random number based on the first array signal and the second array signal.

The first array signal may include a first pulse signal that includes information on a time at which the first emission particle is absorbed and a first location signal that includes information on a location of the first cell, and the second array signal may include a second pulse signal that includes information on a time at which the second emission particle is absorbed and a second location signal that includes information on a location of the second cell, and the generating of the random number may include generating the random number based on the first and second pulse signals and the first and second location signals.

The generating the random number may include: generating a first random number based on the first pulse signal and the second pulse signal; and generating a second random number based on the first location signal and the second location signal.

The method may further include amplifying the first array signal and the second array signal.

The method may further include supplying reverse bias power to the first cell and the second cell.

A quantum random number generation apparatus according to an exemplary embodiment of the present invention includes: a first cell that absorbs a first particle at a first time, and outputs a first array signal at a second time in response to an absorption event at which the first particle is absorbed; a second cell that absorbs a second particle emitted at a third time between the first time and the second time, and outputs a second array signal in response to an absorption event at which the second particle is absorbed; and a signal processor that generates a random number based on the first array signal and the second array signal.

The first particle and the second particle may be emitted from a radioactive material.

The quantum random number generation apparatus may further include a substrate that includes a first side facing the radioactive isotope and on which the first cell and the second cell are disposed.

The quantum random number generation apparatus may further include a resistance circuit that is electrically connected with the first cell and the second cell, and transmits the first array signal and the second array signal to the signal processor.

The first array signal may include a first pulse signal that includes information on the first time and a first location signal that includes information on a location of the first cell, the second array signal may include a second pulse signal that includes information on the third time and a second location signal that includes information on a location of the second cell, and the signal processor may generate the random number based on the first and second pulse signals and the first and second location signals.

The signal processor may generate a first random number based on the first pulse signal and the second pulse signal, and may generate a second random number based on the first location signal and the second location signal.

The quantum random number generation apparatus may further include: an amplification circuit that amplifies the generated first array signal and second array signal and transmits the amplified first and second array signals to the signal processor; and a reverse bias power source that supplies reverse bias power to the first cell and the second cell, and is formed of a closed circuit with the first cell and the second cell.

According to the exemplary embodiments of the present invention, a space area in the emission particle detector that absorbs emission particles emitted upon collapse of an isotope such that a new type of random number conversion method that combines a spatial randomness and existing temporal randomness of the emission particle can be provided.

In addition, according to the exemplary embodiments of the present invention, since there are no other emitted particles in the dead time in each cell, there is no restriction due to the dead time.

In addition, according to the exemplary embodiments of the present invention, the emission particle detector is sufficiently divided and an independent detection function is assigned to each cell such that the random number generation rate can be remarkably increased.

Further, according to the exemplary embodiments of the present invention, it is possible to generate a pure random number at high speed, which is required by a computer, a network processor, or an IoT device.

DETAILED DESCRIPTION OF THE EMBODIMENTS

Figure 1:
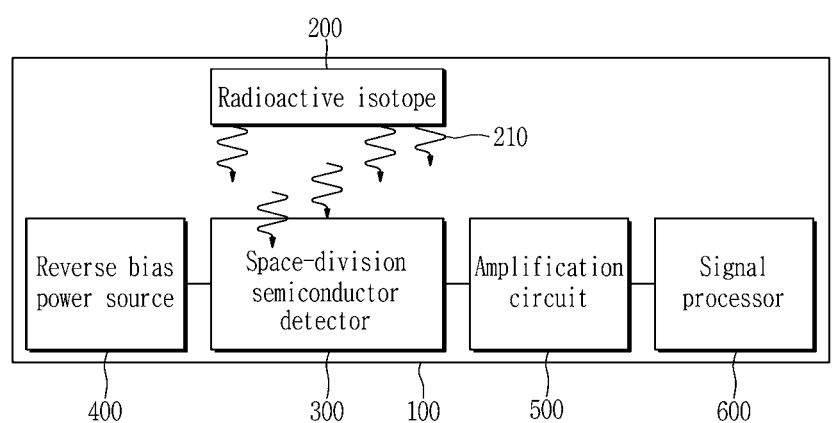
FIG. 1 is a block diagram of a quantum random number generating apparatus according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is a quantum random number generating apparatus according to an exemplary embodiment of the present invention.

As shown in FIG. 1, a quantum random number generating apparatus 100 according to an exemplary embodiment of the present invention may include a radioactive isotope 200, a space-division semiconductor detector 300, a reverse bias power source 400, an amplification circuit 500, and signal processor 600.

Emission particles 210 may be emitted from the radioactive isotope 200 due to a natural decay phenomenon of the radioactive isotope 200, and at least some of the emission particles 210 are incident on the space-division semiconductor detector 300.

The space-division semiconductor detector 300 absorbs the emission particles 210. After absorbing the emission particles 210, the space-division semiconductor detector 300 generates an array signal. The space-division semiconductor detector 300 transmits the array signal to the amplification circuit 500.

The amplification circuit 500 amplifies the transmitted array signal. The amplification circuit 500 transmits the amplified array signal to the signal processor 600.

The signal processor 600 generates a pure random number in a digital form by using the amplified array signal.

The reverse bias power source 400 may be electrically connected with the space-division semiconductor detector 300. When reverse bias power is applied to the reverse bias power source 400, a threshold voltage of a diode included in the space-division semiconductor detector 300 is decreased, and accordingly, sensitivity of a sensing operation with respect to the emission particles 210 of the space-division semiconductor detector 300 may be increased.

Figure 2:
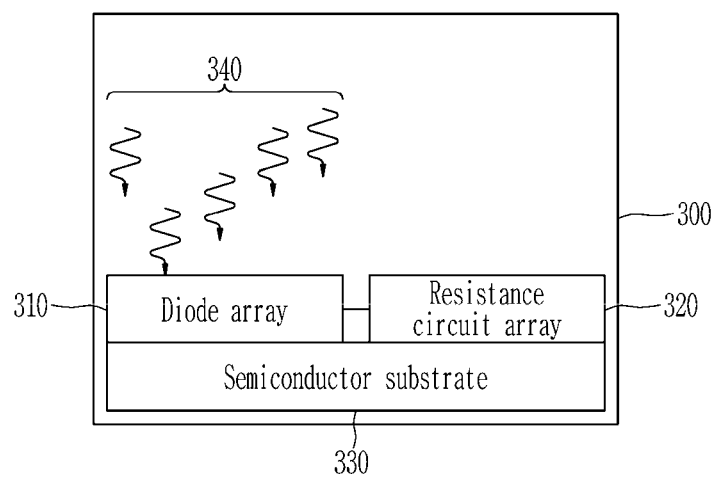
FIG. 2 is a block diagram of a space-division semiconductor detector according to the exemplary embodiment of the present invention.

FIG. 2 is a block diagram of the space-division semiconductor detector according to the exemplary embodiment of the present invention.

As shown in FIG. 2, the space-division semiconductor detector 300 is formed through a semiconductor process, and includes a diode array 310 and a resistance circuit array 320. In the space-division semiconductor detector 300, the diode array 310 is disposed in a part of a first side that faces a radiation irradiation area 340 among opposite sides of a semiconductor substrate 330, the resistance circuit array 320 is disposed in another part of the first side, and the resistance circuit array 320 may be connected with the diode array 310.

The diode array 310 includes a plurality of diode cells on which emission particles (e.g., emission particles 210) emitted on the radiation irradiation area 340 are incident.

The resistance circuit array 320 includes a plurality of resistance circuit cells that are respectively connected with the diode cells included in the diode array 310.

Figure 3:
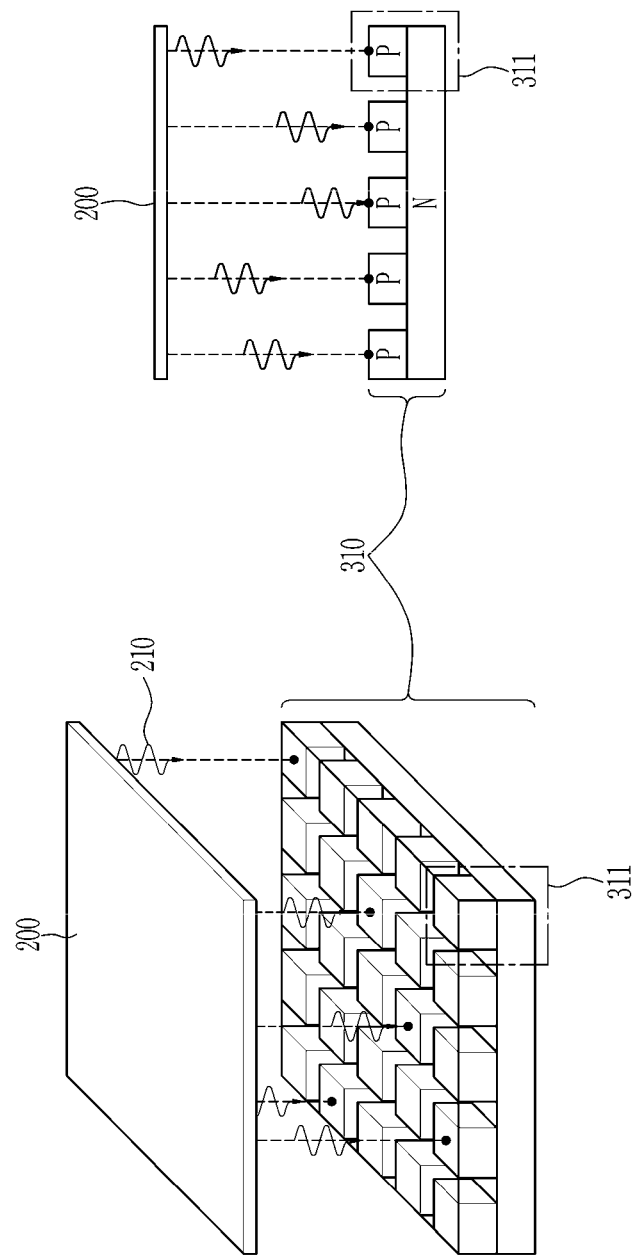
FIG. 3 exemplarily shows a diode array of the space-division semiconductor detector according to the exemplary embodiment of the present invention.

FIG. 3 exemplarily shows the diode array of the space-division semiconductor detector according to the exemplary embodiment of the present invention.

As shown in FIG. 3, the diode array 310 may include a plurality of diode cells 311. Each of the diode cells 311 detects emission particles 210 emitted from the radioactive isotope 200. Each diode cell 311 absorbs one emission particle 210. The emission particles 210 are emitted at random times from random positions, and are detected at random times by diode cells at random locations among the diode cells 311. For example, a first emission particle is absorbed to a first diode cell among the diode cells 311, and then a first array signal is output by the first diode cell in response to an absorption event during which the first emission particle is absorbed, and this may be defined as a dead time. When a second emission particle is emitted during the dead time of the first diode cell, the second emission particle is absorbed by a second diode cell. Thus, each diode cell 311 may serve as an independent detector that is included in the space-division semiconductor detector and individually detects an emission particle.

Figure 4:
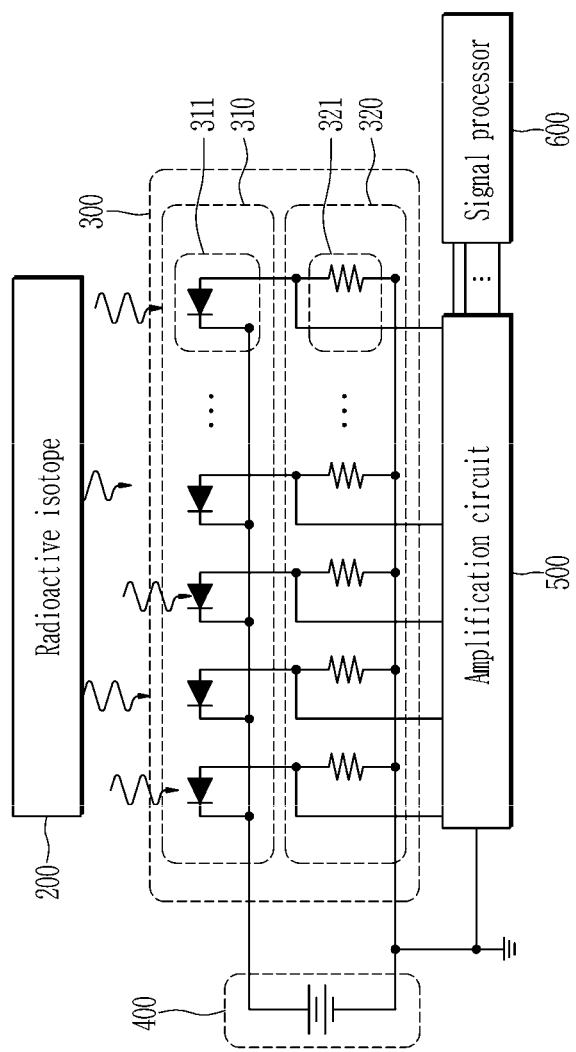
FIG. 4 is a schematic view of a circuit of the space-division semiconductor detector according to the exemplary embodiment of the present invention.

FIG. 4 schematically shows a circuit of the space-division semiconductor detector according to the exemplary embodiment of the present invention.

As shown in FIG. 4, the space-division semiconductor detector 300 is electrically connected with the reverse bias power source 400, and receives power from the reverse bias power source 400.

The space-division semiconductor detector 300 includes the diode array 310 and the resistance circuit array 320. The diode array 310 includes a plurality of diode cells 311, and the resistance circuit array 320 includes a plurality of resistance circuit cells 321. A diode cell 311 and a resistance circuit cell 321 form a closed circuit. The diode array 310 and the resistance circuit array 320 may be manufactured on the same semiconductor substrate 330. The reverse bias power source 400 supplies power to each diode cell 311 and each resistance circuit cell 321.

The amplification circuit 500 and the signal processor 600 may be electrically connected with the space division semiconductor sensor 300. The amplification circuit 500 may be electrically connected with each diode cell 311 and each resistance circuit cell 320. The signal processor 600 may be electrically connected to the amplification circuit 500. The amplification circuit 500 and the signal processor 600 may be manufactured/disposed on the same semiconductor substrate (e.g., the semiconductor substrate 330 of FIG. 2) through a semiconductor process.

When the emission particles 210 are absorbed into the space-division semiconductor detector 300 while power is applied to the closed circuit from the reverse bias power source 400, a current in a pulse form flows in the closed circuit. The pulse-type current is transmitted to the amplification circuit 500, and the amplification circuit 500 amplifies the transmitted pulse-type current.

Figure 5:
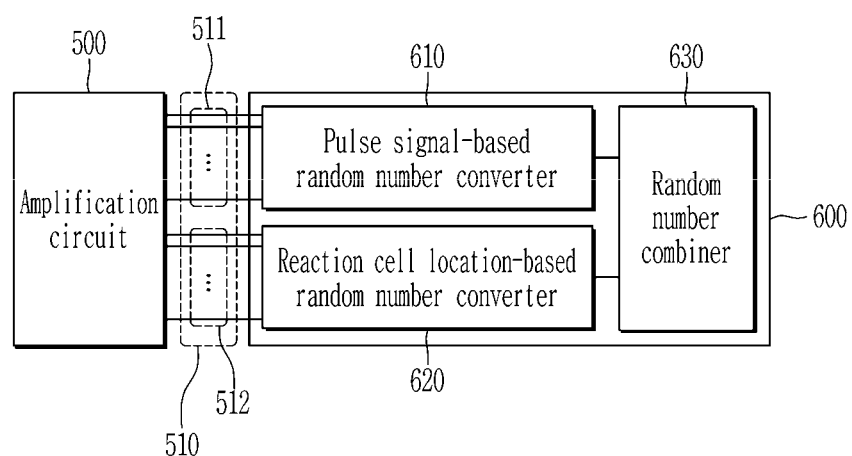
FIG. 5 is a block diagram of an amplification circuit and a signal processor according to the exemplary embodiment of the present invention.

FIG. 5 is a block diagram of the amplification circuit and the signal process according to the exemplary embodiment of the present invention.

As shown in FIG. 5, the signal processor 600 is electrically connected with the amplification circuit 500.

The signal processor 600 receives a pulse-type array signal (the pulse-type current of FIG. 4) 510 from the respective cells (e.g., the diode cells 311 and the resistance circuit cells 321 of FIG. 4) of the space-division semiconductor detector (e.g. the space-division semiconductor detector 300 of FIG. 4). The array signal 510 includes a pulse signal 511 that includes information on time of an absorption event at which the emission particles are absorbed and a location signal 512 that includes information on a location of a cell that detects an emission particle.

The signal processor 600 includes a pulse signal-based random number converter 610 that converts a received pulse signal 511 into a digital-type first random number, and a reaction cell location-based random number converter 620 that converts a received location signal 512 into a digital-type second random number.

The first random number generated from the pulse signal-based random number converter 610 is generated from randomness of collapse time of a radioactive isotope and includes information on time at which an emission particle is absorbed by each diode cell, and the second random number generated from the reaction cell location-based random number converter 620 is generated from spatial randomness of the emission particle and includes information on locations of diode cells to which the respective emission particles are absorbed, and accordingly, the first random number and the second random number are independent of each other.

The signal processor 600 includes a random number combiner 630 that generates a third random number by combining the pulse signal-based first random number and the location signal-based second random number. The third random number generated from the random number combiner 630 includes a random number having a length that is longer than a length of the first random number and a length of the second random number.

The embodiment of the present invention has an effect of increasing the random number generation rate through space division with respect to the quantum random number generation apparatus without controlling the radioactive substance or the emission rate of the radioactive substance.

Recently, since sufficient independent diode cells are arranged by spatially dividing a region where the emission particles are incident by using a micro-process semiconductor technology, it is possible to eliminate the restriction on the random number generation rate according to the dead time inherent to the diode, and the randomness can be randomized to increase the total length of the pure random number. Therefore, it is possible to generate a pure random number at high speed, which is required by a computer, a network processor, or an IoT device.

For example, when a pulse location of a pulse generated from a diode in response to an emission particle emitted per every 8 µs is measured with a 2 MHz (0.5 µs cycle) clock, one pulse is located among a 0 to 15th clock, and thus 4 bits can be made per 8 µs. That is, 500,000 bits are generated every second. However, when the dead time of the semiconductor detector is 20 µs, only a maximum of 50,000 pulses can be detected per second, and thus when 4 bits are substituted per pulse, 200,000 bits are generated per second. This means that the random number generation speed is significantly reduced by the dead time. In this case, if the semiconductor detector cell is divided into four, each cell absorbs one emission particle per 32 µs on average, and there is no restriction of dead time. Accordingly, each cell generates 4 bits while generating a pulse every 32 µs on average. Since 125,000 bits are produced for one second, 500,000 bits are produced by four cells.

In addition, since there is randomness in the process during which emitted emission particles reach one of the four cells, 2 bits can be added per 8 µs. Therefore, 250,000 bits are produced per second. Thus, random numbers of 750,000 bits can be generated in one second through spatial division.

That is, the semiconductor detector had a random number generation rate of 200 kbps due to the dead time of the semiconductor detector, but the random number generation rate can be increased to 750 kbps only through the spatial division of the semiconductor detector. If the number of divided cells is 16, the speed can be increased to 1 Mbps. Meanwhile, when a clock speed is increased, the random generation rate is also increased. When the clock is 2 MHz, the number of bits per pulse is 4, but when raised to 8 MHz, it becomes 6. Therefore, when the speed is 200 kbps at 2 MHz, it is 300 kbps when the speed is 8 MHz. However, it is not effective compared to the speed increase effect of the semiconductor detector with the spatial division.

That is, the random number generation rate is limited by dead time, but the random number generation rate can be made much faster by spatially dividing the cells of the semiconductor detector.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A quantum random number generation apparatus comprising:
   a space-division semiconductor detector including a plurality of cells, each individually absorbing a plurality of emission particles emitted from a radioactive isotope, the space-division semiconductor detector producing:
   a pulse signal that provides information on respective times of absorptions of the plurality of emission particles, and
   a location signal that provides information on respective locations of cells that detect the absorptions of the plurality of emission particles; and
   a signal processor including:
   a pulse signal based random number converter that generates a first random number based on the respective times of absorptions of the plurality of emission particles,
   a reaction cell location based random number converter that generates a second random number based on the respective locations of cells that detect the absorptions of the plurality of emission particles, and
   a random number combiner that generates a third random number based on the first and second random numbers, wherein a random number generation (RNG) bit rate of the random number combiner is greater than a RNG bit rate of the pulse signal based random number converter.

2. The quantum random number generation apparatus of claim 1, wherein the space-division semiconductor detector further comprises a semiconductor substrate, and the plurality of cells are disposed on a first side of the semiconductor substrate, which faces the radioactive isotope.

3. The quantum random number generation apparatus of claim 1, wherein the plurality of cells comprise:
   a plurality of diode cells respectively independently absorbing the plurality of emission particles, and outputting an array signal in response to the absorption event; and
   a plurality of resistance circuit cells that are electrically connected with the plurality of diode cells and transmit the array signal to the signal processor.

4. The quantum random number generation apparatus of claim 3, wherein after a first emission particle is absorbed by a first diode cell, a second emission particle is absorbed by a second diode cell before a first array signal is output in response to an absorption event at which the first emission particle is absorbed.

5. The quantum random number generation apparatus of claim 3, further comprising an amplification circuit that amplifies the array signal and transmits the amplified array signal to the signal processor.

6. The quantum random number generation apparatus of claim 1, further comprising a reverse bias power source that supplies reverse bias power to the plurality of cells and is formed of a closed circuit with the plurality of cells.

7. The quantum random number generation apparatus of claim 1, wherein the third random number has a length longer than a length of the first random number and longer than a length of the second random number.

8. A method for generating a random number by a quantum random number generation apparatus, comprising:
   absorbing a first emission particle through a first cell;
   outputting a first array signal in response to a first absorption event at which the first emission particle is absorbed into the first cell, the first array signal providing timing information of the first absorption event and location information of the first cell;
   absorbing a second emission particle through a second cell before the first array signal is output after the first absorption event;
   outputting a second array signal in response to a second absorption event at which the second emission particle is absorbed into the second cell, the second array signal providing timing information of the second absorption event and location information of the second cell;
   generating a first random number at a first random number generation (RNG) bit rate based on the timing information of the first absorption event and the timing information of the second absorption event;
   generating a second random number based on the location information of the first cell and the location information of the second cell; and
   generating a third random number at a second RNG bit rate based on the first and second random numbers, wherein the second RNG bit rate is greater than the first RNG bit rate.

9. The method of claim 8, further comprising amplifying the first array signal and the second array signal.

10. The method of claim 8, further comprising supplying reverse bias power to the first cell and the second cell.

11. The method of claim 8, wherein the third random number has a length longer than a length of the first random number and longer than a length of the second random number.

12. A quantum random number generation apparatus comprising:
   a first cell that absorbs a first particle at a first time, and outputs a first array signal at a second time in response to an absorption event at which the first particle is absorbed;
   a second cell that absorbs a second particle emitted at a third time between the first time and the second time, and outputs a second array signal in response to an absorption event at which the second particle is absorbed; and
   a signal processor that generates a third random number based on the first array signal and the second array signal by:
   generating a first random number at a first Random Number Generation (RNG) bit rate based on the first time and the third time,
   generating a second random number based on information on a location of the first cell and information on a location of the second cell, and
   generating the third random number at a second RNG bit rate based on the first and second random numbers, wherein the second RNG bit rate is greater than the first RNG bit rate.

13. The quantum random number generation apparatus of claim 12, wherein the first particle and the second particle are emitted from a radioactive material.

14. The quantum random number generation apparatus of claim 13, further comprising a substrate that includes a first side facing the radioactive material and on which the first cell and the second cell are disposed.

15. The quantum random number generation apparatus of claim 12, further comprising a resistance circuit that is electrically connected with the first cell and the second cell, and transmits the first array signal and the second array signal to the signal processor.

16. The quantum random number generation apparatus of claim 12,
   wherein the first array signal comprises a first pulse signal that includes information on the first time and a first location signal that includes the information on the location of the first cell,
   wherein the second array signal comprises a second pulse signal that includes information on the third time and a second location signal that includes the information on the location of the second cell, and
   wherein the signal processor generates the third random number based on the first and second pulse signals and the first and second location signals.

17. The quantum random number generation apparatus of claim 12, further comprising:
   an amplification circuit that amplifies the generated first array signal and second array signal and transmits the amplified first and second array signals to the signal processor; and
   a reverse bias power source that supplies reverse bias power to the first cell and the second cell, and is formed of a closed circuit with the first cell and the second cell.

18. The quantum random number generation apparatus of claim 12, wherein the third random number has a length longer than a length of the first random number and longer than a length of the second random number.

* * * * *